United States Patent [19]

MacConnell

[11] Patent Number: 4,595,804
[45] Date of Patent: Jun. 17, 1986

[54] AUXILIARY KEYBOARD

[75] Inventor: Robert N. MacConnell, Centerville, Ohio

[73] Assignee: The Mead Corporation, Dayton, Ohio

[21] Appl. No.: 721,010

[22] Filed: Apr. 8, 1985

[51] Int. Cl.$^4$ .............................................. H01H 3/12
[52] U.S. Cl. ................................... 200/5 A; 235/146; 340/365 VL; 400/474
[58] Field of Search .................... 340/365 R, 365 VL; 400/473, 474; 200/159 B, 5 A, 307, 309; 235/146, 145 R, 145 A; 364/188, 189

[56] References Cited

U.S. PATENT DOCUMENTS 2,727,690 12/1955 Bindel ................................ 235/146

OTHER PUBLICATIONS

Harwood et al., "Keyboard Aid for Handicapped Operator," IBM Tech. Disclosure Bulletin, vol. 23, No. 8, 1-81, pp. 3892-3893.

Primary Examiner—A. D. Pellinen
Assistant Examiner—Morris Ginsburg
Attorney, Agent, or Firm—Biebel, French & Nauman

[57] ABSTRACT

An auxiliary keyboard of generally U-shaped configuration for clamping onto a stand-alone computer keyboard. The auxiliary keyboard has a membrane provided with a series of touch-sensitive areas for enabling operator input of special functions into an associated computer. The auxiliary keyboard is provided with a removable designation strip having specially imprinted function designating areas.

6 Claims, 5 Drawing Figures

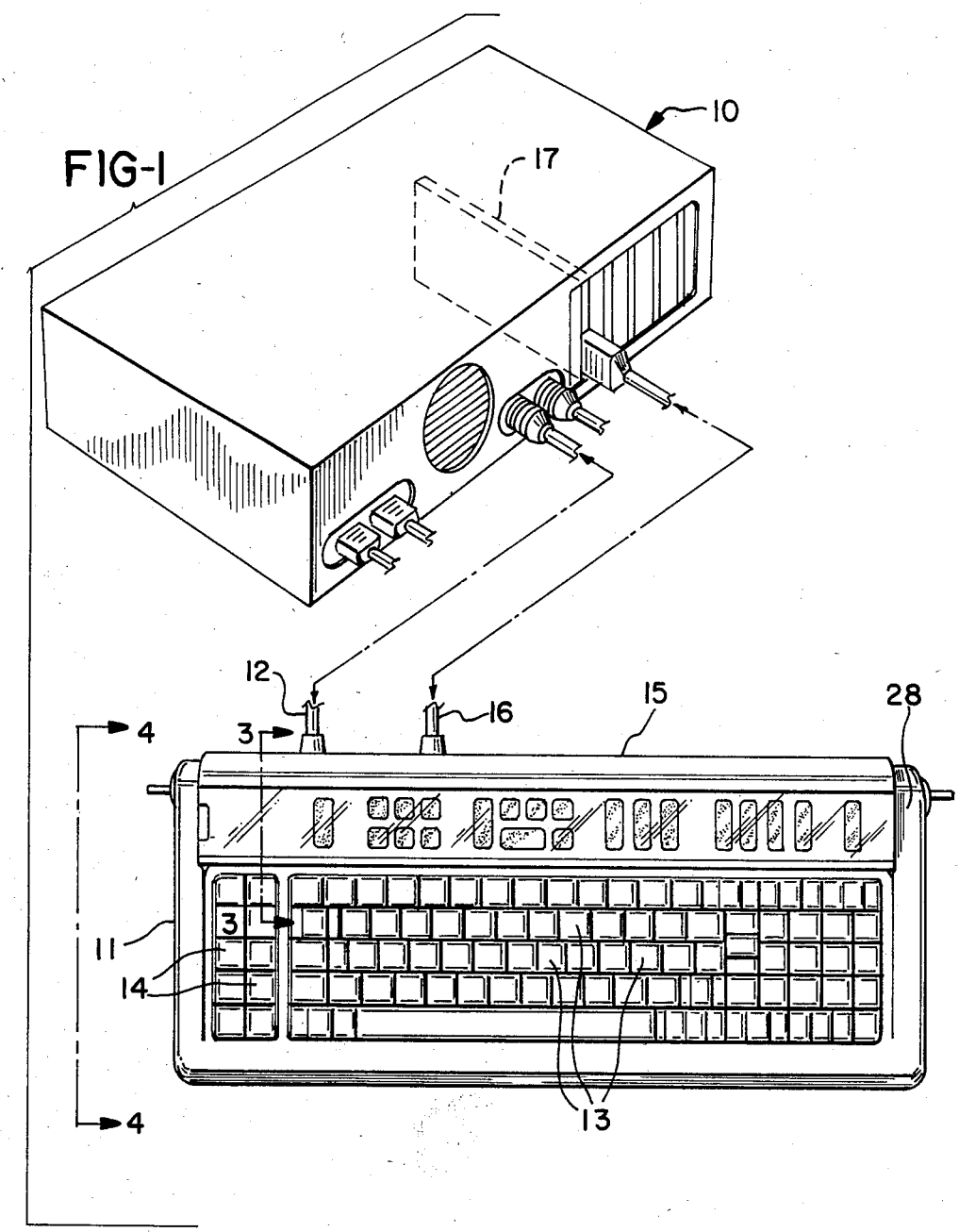

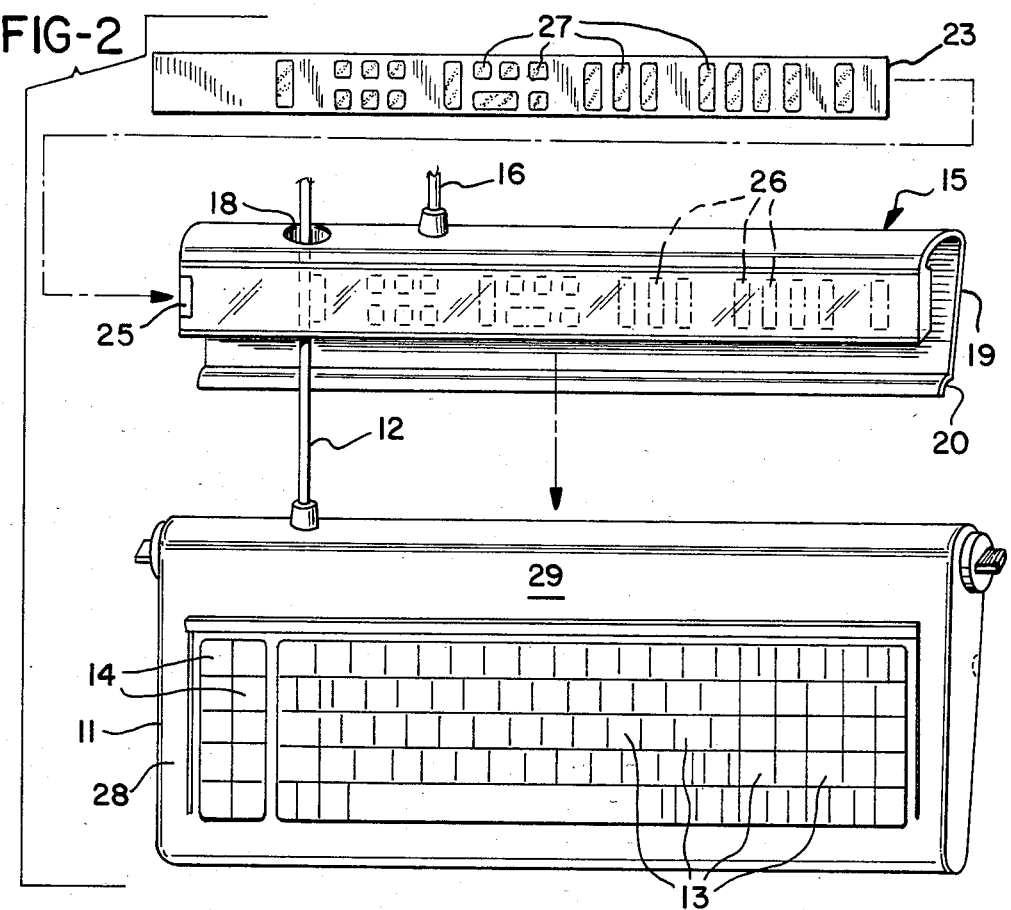
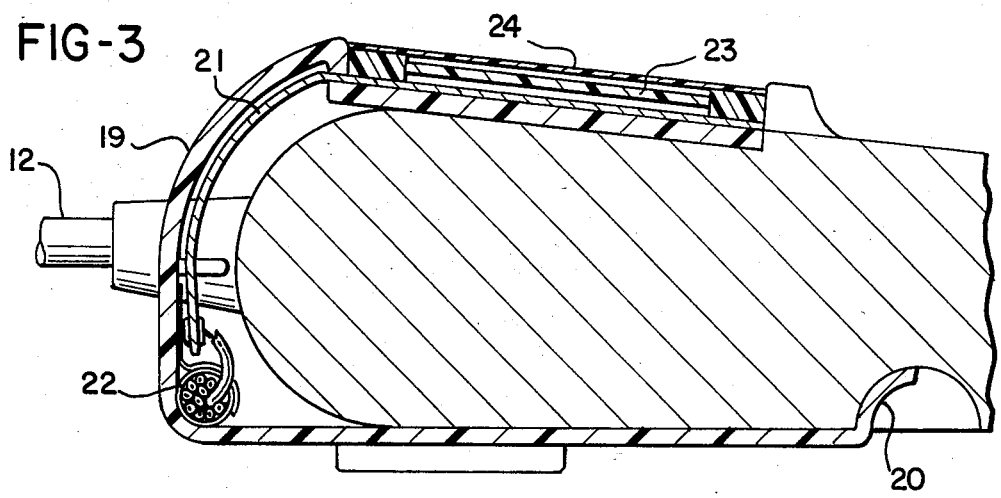

AUXILIARY KEYBOARD

BACKGROUND OF THE INVENTION

This invention relates to stand-alone keyboards of the type commonly provided for use with personal computers. Such keyboards customarily are connected to the computer by a cable of sufficient length to permit convenient physical separation from the computer. Such keyboards are provided with a series of general purpose keys and may also have a series of special function keys. Such special function keys enable the computer to interpret entries from the general purpose keys in accordance with some special function designated by the user. For example, the computer may specially equipped to communicate with a remote data base such as the Lexis (registered trademark of the Mead Corporation) information retrieval system. The owner of the data base may provide the user with the option of aquiring a specially configured, dedicated terminal or, alternatively, using a modification kit for a standard, commercially available computer system. If the latter option is selected, then the modification kit must be configured to enable usage of the general purpose keys and the special function keys in a manner approximating the usage of the keys provided on the corresponding specially configured terminal. That oftentimes leads to an awkard and inconvenient operational routine for the user. It is therefore seen that there is a need for improved apparatus for enabling the entry of special format information into a computer system.

SUMMARY OF THE INVENTION

This invention provides an auxiliary keyboard for a computer system comprising a stand-alone keyboard having a series of keys mounted upon a face plate in such a manner as to leave a substantial margin along one edge. The auxiliary keyboard has a generally U-shaped configuration for clamping engagement around the edge of the main keyboard so as to rest in the free marginal area. The auxiliary keybard is provided with a series of touch-sensitive keys in communication with an electrical cable configured for connection to the computer. The auxiliary keyboard may be provided with an aperture to enable passage of an electrical cable servicing the main keyboard. The auxiliary keyboard also may be provided with a removable designation strip imprinted with selected function designating areas and mounted over the touch-sensitive keys.

BRIEF DESCRIPTION OF THE DRAWINGS

FIG. 1 is a pictorial sketch of a computer system equipped with an auxiliary keyboard in accordance with the present invention.

FIG. 2 illustrates the mounting of an auxiliary keyboard upon a main keyboard.

FIG. 3 is a view taken along lines 3—3 of FIG. 1.

DESCRIPTION OF THE PREFERRED EMBODIMENT

A computer system equipped for use of the present invention is illustrated pictorially in FIG. 1. Such a system may comprise a console 10 for housing a microprocessor, memory boards, a power supply, disc drives and other components customarily associated with a personal computer. Console 10 forms no part of this invention, and is illustrated from the rear in order to show connections to a stand alone keyboard 11. Keyboard 11 and console 10 are interconnected by a cable 12.

Figure 4:
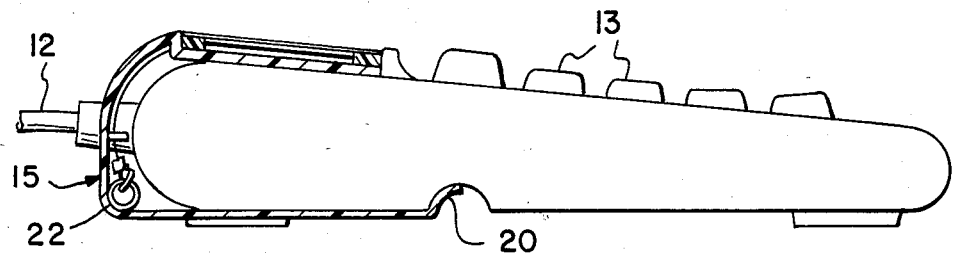
FIG. 4 is a view taken along lines 4—4 of FIG. 1.

Keyboard 11 has a face plate 28 upon which are mounted a series of general purpose keys 13 and a smaller number of special function keys 14. An auxiliary keyboard 15 is mounted upon main keybaord 11, as illustrated in FIGS. 2, 3 and 4.

Referring now to FIG. 3, auxiliary keyboard 15 may be observed to comprise a generally U-shaped support structure 19 provided with an inwardly depending foot 20. Support member 19 may be a semi-rigid thermoplastic extrusion fabricated from any of a wide variety of plastics. Support structure 19 snaps clampingly over the rear wall of main keyboard 11 so as to cover a marginal area 29 of face plate 28. Foot 20 snaps into a mating indentation on the lower surface of keyboard 11. It will be appreciated that support structure 19 must be configured to provide a conforming fit around the surface of keyboard 11. The illustrated keyboard 11 is a keyboard for an IBM personal computer. Other keyboards may be configured differently, and the support structure 19 must be configured accordingly.

As best illustrated in FIG. 3, auxiliary keyboard 15 comprises a flexible membrane 21 provided with a series of touch-sensitive areas 26 (FIG. 2) supported by support structure 19. Membrane 21 may be provided with a series of printed circuits (not illustrated) extending from switching areas 26 to a membrane cable 22. Membrane cable 22 is connected to auxiliary keyboard cable 16, which in turn is plugged into the rear of computer console 10. Cable 16 is connected to an adapter card 17 which may be designed in accordance with well-known techniques for interfacing auxiliary keyboard 15 into the computer system. The design of the circuitry for adapter card 17 will depend upon the type of response desired for inputs from auxiliary keyboard 15.

Auxiliary keyboard 15 further comprises a clear plastic overlay 24 mounted upon suport structure 19 in such a way as to define a pocket above the touch-sensitive area of membrane 21. A designation strip 23 is slipped into this pocket. Designation strip 23 is imprinted with a series of designation areas 27, which may include printed legends (not illustrated). Individual designation areas 27 may overlie corresponding touch-sensitive areas 26 or a plurality of touch-sensitive areas, depending upon the functions which may be desired. Designation strip 23 may be fabricated from a strip of relatively thin cardboard or plastic of a size cut to fit within the above described pocket. Designation strip 23 is sufficiently thin as to provide no interference with the operation of touch-sensitive areas 26. It will be understood that an operator will be trained to recognize the designation areas 27 and to touch the appropriate designation areas for producing a desired computer function. The computer may be configured to respond to a number of different special function protocols for which different designation strips 23 may be provided. Different designation strips 23 will have different designation areas 27 printed thereon. Plastic overlay 24 is provided with a small cutout 25 to facilitate removal of designation strip 23 from auxiliary keyboard 15.

Figure 5:
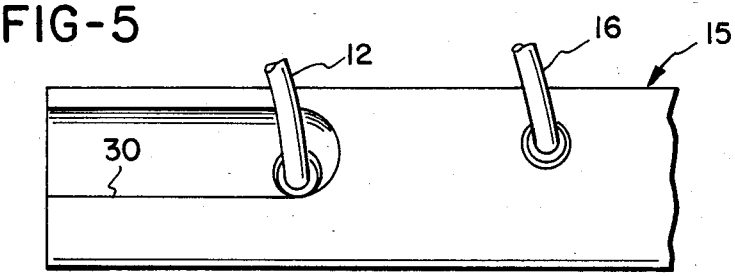
FIG. 5 is an illustration of a portion of the rear section of a keyboard equipped with an auxiliary keyboard in an alternative embodiment.

Stand-alone keyboards of the type with which the present invention may be used oftentimes have their cable connection along the rear wall thereof. Accordingly, auxiliary keyboard 15 is provided with an aperture 18 to enable passage therethrough of cable 12. Alternatively, as illustrated in FIG. 5, support structure 19 may be provided with an elongated slot 30 for enabling passage of cable 12.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. For a computer system comprising a stand-alone keyboard having a series of keys mounted upon a face plate in such a manner as to leave a substantial margin adjacent at least one edge thereof: an auxiliary keyboard comprising a generally U-shaped support structure for clamping around said edge and over said margin, a series of keys mounted on said support structure in the portion thereof which overlies said margin when the auxiliary keyboard is so clamped, and electrical cable means supported by said support structure and electrically connected to said keys.

2. The auxiliary keyboard according to claim 1 further comprising a flexible membrane mounted upon said support structure in the portion thereof which overlies said margin when the auxiliary keyboard is so clamped; said keys comprising touch senstive areas within said membrane.

3. The auxiliary keyboard according to claim 2 further comprising a transparent cover mounted upon said support structure to define a pocket over said keys and a designation strip imprinted with selected function designating areas removably inserted into said pocket.

4. The auxiliary keyboard according to claim 2 wherein said electrical cable means is mounted upon the portion of said support structure which overlies said edge when the auxiliary keyboard is so clamped.

5. The auxiliary keyboard according to claim 4 wherein said support structure is provided with an opening for passage of cable means servicing said stand-alone keyboard.

6. The auxiliary keyboard according to claim 5 wherein said opening is an enclosed aperture.

* * * * *